United States Patent [19]
Morimoto et al.

[11] 4,102,834
[45] Jul. 25, 1978

[54] HYDROCARBON RESINS AND PROCESS FOR PREPARING SAME

[75] Inventors: Teijiro Morimoto, Iwakuni; Isao Hashimoto, Waki; Yoshiyuki Iwase, Iwakuni, all of Japan

[73] Assignee: Mitsui Petrochemical Industries, Ltd., Tokyo, Japan

[21] Appl. No.: 628,824

[22] Filed: Nov. 4, 1975

[30] Foreign Application Priority Data

Nov. 5, 1974 [JP] Japan ............................... 49-126543

[51] Int. Cl.$^2$ ........................... C08F 240/00; C09J 3/14
[52] U.S. Cl. ..................................... 260/4 AR; 260/5; 260/28.5 A; 260/874; 260/888; 260/889; 260/892; 260/896; 260/897 A; 526/76; 526/283; 526/290
[58] Field of Search ........................... 526/283, 290, 76; 260/4 AR, 888, 889, 896, 897 A, 28.5 A, 5

[56] References Cited

U.S. PATENT DOCUMENTS

| 2,773,051 | 12/1956 | Leary | 526/283 |
|---|---|---|---|
| 2,798,865 | 7/1957 | Banes et al. | 526/283 |
| 3,468,837 | 9/1969 | Wheeler et al. | 526/290 |
| 3,554,940 | 1/1971 | Arakawa et al. | 526/290 |
| 3,640,977 | 2/1972 | Gonzenbach et al. | 526/283 |
| 3,784,530 | 1/1974 | Osborn et al. | 526/290 |
| 3,927,144 | 12/1975 | Hayashi et al. | 526/283 |

Primary Examiner—John C. Bleutge
Attorney, Agent, or Firm—Sherman & Shalloway

[57] ABSTRACT

A process for preparing a hydrocarbon resin which comprises copolymerizing (A) a hydrocarbon fraction boiling within the range of 130° to 300° C. obtained by cracking, reforming and/or refining petroleum with (B) dicyclopentadiene in the presence of a Friedel-Crafts catalyst in a proportion such that the resulting hydrocarbon resin contains, based on the total weight thereof, 20 to 80% of a unit derived from the dicyclopentadiene (B).

A hydrocarbon resin having a number average molecular weight of 300 to 2500, a softening point of 40° to 180° C., a bromine number of 5 to 100 g/100 g, and a Gardner color hue of 5 to 17, prepared by the above process. This hydrocarbon resin is useful as an adhesive component of pressure-sensitive adhesives and hot-melt composition.

25 Claims, No Drawings

HYDROCARBON RESINS AND PROCESS FOR PREPARING SAME

This invention relates to hydrocarbon resins and, in particular, to a new hydrocarbon resin, a process for preparing same and the use of same for pressure-sensitive adhesives or hot melt compositions.

As the tackifier for pressure-sensitive adhesives or hot melt compositions used for hot-melt type adhesives that are widely used for adhesive tapes, the natural resins such as rosin and terpene resins have been used heretofore. These natural resins possess various advantages such as low toxicity and good compatibility with many kinds of chemical compounds, and either as such or after modification, exhibit superior performance in a variety of applications such as adhesives, paints and sizes. However, since they are natural resources, they have the drawback that their quality is not uniform and there is a limit to the amount in which they can be supplied.

As a consequence, lately, there is a move to use as a substitute for the aforesaid natural resins the so-called "petroleum resins" that are prepared by the polymerization of the polymerizable unsaturated components that are contained in the hydrocarbon mixture obtained in the cracking, reforming and/or refining of petroleum, using as the polymerization catalyst a Friedel-Crafts catalyst.

However, when the presently commercially available petroleum resins are used as tackifiers for the pressure-sensitive adhesives and/or hot-melt type adhesives, they are considerably inferior in their performance when compared to the natural resins such as the aforementioned rosin or terpene resins. Hence, as a practical matter, they do not give sufficient satisfaction as yet. For instance, when the petroleum resins are used for the hydrocarbon rubber type pressure-sensitive adhesives, they have such shortcomings as that their initial tackiness is small and that moreover their adhesive strength is insufficient. Again, when the petroleum resins are to be used for the ethylene-vinyl acetate copolymer type hot-melt type adhesive, they possess the fatal defect that their compatibility with the ethylene-vinyl acetate copolymer is poor, with the consequence that difficulty is experienced in providing an adhesive having great adhesive strength.

The petroleum resins, in contrast to the aforementioned natural resins, have the advantage that the stability of their quality and supply is great. However, their utility is imposed a great restriction because of the defects such as hereinbefore noted.

It is therefore an object of this invention to provide a new hydrocarbon resin that is especially valuable as a tackifier for the pressure-sensitive adhesives and hot-melt type adhesives.

Another object of this invention is to provide a process for preparing such a new resin.

A further object of the present invention is to provide a pressure-sensitive adhesive possessing in combination such properties as superior tackiness, adhesive strength and cohesion, as well as a hot-melt composition excelling in adhesive strength.

Other objects and advantages of the invention will become apparent from the following description.

There is provided in accordance with the present invention a process for preparing a hydrocarbon resin which comprises copolymerizing (A) a hydrocarbon fraction boiling in the range of 130° to 300° C. obtained by cracking, reforming and/or refining petroleum with (B) dicyclopentadiene in the presence of a Friedel-Crafts catalyst in a proportion such that the resulting hydrocarbon resin contains 20 to 80% by weight based on the total weight of the hydrocarbon resin of the unit derived from the dicyclopentadiene (B).

The process of this invention is characterized in that, of the petroleum fractions used in the preparation of the petroleum resins, the hydrocarbon fraction boiling in the range of 130° to 300° C. and containing a large amount of the cationically polymerizable aromatic hydrocarbons is copolymerized with dicyclopentadiene. As a consequence, the disadvantages such as hereinabove indicated when the conventional petroleum resin is used alone as the tackifier for the pressure-sensitive adhesives or the hot-melt type adhesives are overcome.

The hydrocarbon fraction (A) used in this invention is that fraction boiling within the temperature range of from 130° to 300° C. that is recovered from the processes of cracking, reforming and/or refining of petroleum, i.e., a fraction having an initial boiling point of 130° C. or higher and an end boiling point of 300° C. or lower. In the invention process a hydrocarbon fraction boiling preferably in the range of 135 – 280° C., and particularly 140° – 210° C. is used with advantage.

The hydrocarbon fraction (A) boiling within the temperature range of 130° to 300° C. contains a large amount of polymerizable unsaturated hydrocarbons, and while the amount of such hydrocarbons varies depending upon the class of petroleum or boiling point, they usually account for 20 to 80% by weight, and preferably 30 to 75% based on the total weight of the hydrocarbon fraction (A).

The foregoing polymerizable unsaturated hydrocarbons consists predominantly of cationically polymerizable aromatic hydrocarbons, i.e., aromatic hydrocarbons having cationically polymerizable double bonds in their molecules, e.g., styrene, indene and derivatives thereof, inter alia the $C_8$ to $C_{12}$ derivatives thereof such as alpha-methylstyrene, beta-methylstyrene, vinyltoluene, methylindene and the like. In addition, there also is contained a small proportion of olefins, especially the $C_9$ to $C_{12}$ olefins, and diolefins, especially the $C_9$ to $C_{12}$ diolefins.

The hydrocarbon fraction (A) usable in this invention can be prepared, say, by removing the $C_2$ to $C_7$ olefins and aromatic hydrocarbons such as benzene, toluene and xylene that are distilled off at relatively low temperatures, as well as the higher boiling fractions such as tar or pitch, from petroleum or hydrocarbon oils obtained by cracking (e.g. see U.S. Pat. No. 3,379,663) or reforming of petroleum in the processes of cracking, reforming or refining petroleum.

While the composition of the hydrocarbon fraction boiling within the temperature range of 130° to 300° C. varies depending upon the class of the starting petroleum, its processing treatment and boiling point range, in Table 1 is shown by way of reference a typical composition. It is however to be understood that the composition of the hydrocarbon fraction (A) usable in the present invention is not to be limited in any sense by the ranges indicated below.

Table 1

| Component | Percent by Weight* |
|---|---|
| Polymerizable unsaturated hydrocarbons | 20 – 80 (30 – 75) |

Table 1-continued

| Component | Percent by Weight* |
|---|---|
| Non-polymerizable aromatic hydrocarbons | 15 – 50 (20 – 40) |
| Paraffins and naphthalenes | 5 – 30 (10 – 25) |

*Percent by weight is based on the total weight of the hydrocarbon fraction. The figures in the parantheses indicate preferred proportions.

In Table 1, above, the non-polymerizable aromatic hydrocarbons are typified by the $C_9$ to $C_{12}$ alkylbenzenes (main components) with traces of benzene, toluene and xylene. On the other hand, the typical paraffins are the aliphatic and alicyclic saturated hydrocarbons of 9 to 12 carbon atoms.

The foregoing polymerizable unsaturated hydrocarbons usually have a bromine number of 120 to 170, and preferably 130 to 160, and are comprised typically of the components indicated in the following Table 2.

Table 2

| Component | Percent by Weight* |
|---|---|
| Cationically polymerizable aromatic hydrocarbons | 60 – 90 (70 – 90) |
| Olefins | 5 – 15 ( 5 – 10) |
| Diolefins | 0 – 10 ( 1 – 5 ) |

*Percent by weight is based on the total weight of the polymerizable unsaturated hydrocarbons, the figures in the parentheses being the preferred range.

In the above Table 2, typical of the olefins are the aliphatic monoolefins of 9 to 12 carbon atoms.

The cationically polymerizable aromatic hydrocabon component is believed to have typically a composition such as illustrated in Table 3 below.

Table 3

| Component | Percent by Weight* |
|---|---|
| Vinyltoluene, Indene | 30 – 80 (35 – 70) |
| Styrene, Alpha-methylstyrene, Methylindene, Beta methylstyrene | 15 – 50 (20 – 40) |
| Other cationic polymerizable aromatic hydrocarbon having $C_9$ – $C_{12}$ carbon atoms (e.g. β-methylstyrene; divinylbenzene; $C_1$ – $C_4$ alkyl styrene) | 0 – 15 ( 0 – 10) |

*Percent by weight is based on the total weight of said cationically polymerizable aromatic hydrocarbon, the figures in the parentheses being the preferred ranges.

On the other hand, the dicyclopentadiene to be used for copolymerizing with the aforesaid hydrocarbon fraction can be used in its substantially isolated form or in its unpurified form, say, crude benzol containing a considerable amount of dicyclopentadiene or petroleum naphtha as obtained. Again, it also may be in the form of a dimerization reaction mixture of cyclopentadiene. When the dicyclopentadiene is used in its unpurified form, it is preferred insofar as possible that it does not contain other polymerizable unsaturated hydrocarbons. In the case such other polymerizable unsaturated hydrocarbons are contained, the dicyclopentadiene should preferably account for at least 80% by weight of all the polymerizable unsaturated hydrocarbons.

On the other hand, when an unpurified starting materal such as the crude benzol or petroleum naphtha is used, the concentration of the dicyclopentadiene in the starting material is not critical, but since the efficiency of the copolymerization reaction suffers when the concentration is too low, it is usually advantageous that the dicyclopentadiene be contained in an amount of 30% by weight, and preferably 50% by weight.

The copolymerization reaction of the hydrocarbon (A) with the dicyclopentadiene (B) being a cationic copolymerization reaction can be carried out by using the Friedel-Crafts catalysts. Any of those generally known as being the Friedel-Crafts catalysts can be used, including such, for example, as aluminum chloride, aluminum bromide, ethylaluminum dichloride, titanium tetrachloride, stannic tetrachloride, antimony pentachloride, boron trifluoride and the various complexes of boron trifluoride (e.g. boron trifluoride-phenol complex, and boron trifluoride-ethanol complex), of which especially convenient are aluminum trichloride, boron trifluoride and the complexes of boron trifluoride.

While the amount used of the catalyst is not critical and can be varied over a wide range in accordance with such conditions as the class of the hydrocarbon, and its ratio of copolymerization with the dicyclopentadiene or the polymerization conditions, in general, it is advantageous to use the catalyst in an amount of 0.01 to 5% by weight, and preferably 0.05 to 2% by weight, of the total weight of the polymerizable unsaturated components that are contained in the starting monomer mixture.

The polymerization reaction can be carried out in a similar manner as in the case of the usual polymerization reactions which use the Friedel-Crafts catalysts.

While it is not especially necessary to use a solvent in carrying out the polymerization reaction, if necessary, in such cases where difficulty is experienced in carrying out the polymerization uniformly on account of the evolution of heat of polymerization or rise in the viscosity inside the polymerization system to an excessive degree, an inert solvent can be used. As suitable solvents, there can be mentioned the aliphatic hydrocarbons such as pentane, hexane, heptane and octane; alicyclic hydrocarbons such as cyclopentane, cyclohexane and methylcyclohexane; the aromatic hydrocarbons such as benzene, toluene, xylene, ethylbenzene, cumene and cymene; the aliphatic halogenated hydrocarbons such as methylene chloride and dichloroethane; and the nitro compounds such as nitromethane and nitrobenzene. These solvents can be used either singly or in combinations of two or more thereof.

The polymerization temperature will vary depending upon the composition of the starting material and the classes and amounts of the catalyst and solvent, but usually a temperature ranging from −10° to 100° C. is chosen, especially preferred being a temperature in the range of 10° – 60° C. On the other hand, a polymerization time of 0.5 to 10 hours will do, and usually 1 to 5 hours is sufficient. While the polymerization reaction is usually carried out at normal atmospheric pressure, it may also be carried out at superatmospheric or reduced pressures, if necessary.

Further, the polymerization can be performed in air, but, for avoiding the polymerization inhibiting action of oxygen contained in air, as a rule, the reaction should be carried out in an atmosphere of an inert gas such, for example, as nitrogen, The polymerization ratio of the hydrocarbon fraction (A) to the dicyclopentadiene (B) can be so chosen that the resulting hydrocarbon resin contains the unit derived from the dicyclopentadiene in an amount of 20 to 80% by weight, and preferably 30 to 70% by weight, based on the total weight of the hydrocarbon resin.

While the proportion in which the two starting materials, i.e., the hydrocarbon fraction (A) and the dicyclopentadiene (B), are used cannot be unqualifiedly indicated, since this will depend on such factors as the concentration of the polymerizable unsaturated hydrocarbons in the hydrocarbon fraction (A), the class of the catalyst and the polymerization conditions, it can be readily determined by those skilled in the art by the performance of simple routine experiments.

If, by way of reference, the proportion in which the two starting materials (A) and (B) are used is illustrated, that wherein the hydrocarbon (A) and the dicyclopentadiene (B) are used such that the weight ratio of the polymerizable unsaturated hydrocarbons in the fraction (A) to dicyclopentadiene (B) becomes 1:9 to 3:1, and more preferably 1:4 to 13:7, is advantageous.

After completion of the polymerization reaction, the recovery of the intended hydrocarbon resin from the reaction system can be carried out by procedures which per se are known. For example, after completion of the polymerization reaction, either water, an aqueous alkali solution or alcohol is added to the reaction system to decompose the polymerization catalyst, after which the unreacted monomer and solvents are distilled off to obtain the intended hydrocarbon resin.

The hydrocarbon resin prepared by the foregoing invention process is a new resin which has yet to be mentioned in the literature and has the following properties.

| | | |
|---|---|---|
| (1) | Number average molecular weight as measured by vapor pressure osmometry: | 300 to 2500, preferably 400 to 1800 |
| (2) | Softening point as measured by the ring and ball method described in Japanese Industrial Standard K-2531: | 40 to 180° C., preferably 60 to 150° C. |
| (3) | Bromine number, $Br_2$ g/ 100 g, as measured by the method described in Japanese Industrial Standard K-2543: | 5 to 100/100 g, preferably 10 to 70/100 g |
| (4) | Gardner color hue as measured by the method described in ASTM D-1544–58T: | 5 to 17, preferably 5 to 14 |

The new hydrocarbon resin provided by the present invention possesses extremely excellent properties when used as the tackifier component in pressure-sensitive adhesives widely used for adhesive tapes, adhesive labels, adhesive wallpapers, and the like, and hot-melt compositions used for making cans, shoes, bags, seals, and for book binding and wood working purpose as well as for coating purpose.

That is to say, when the hydrocarbon resin of this invention is blended with hydrocarbon rubber for the purpose of functioning as a tackifier component of the hydrocarbon rubber type pressure-sensitive adhesive, it demonstrates superior initial tackiness, adhesive strength and cohesion, and it does not suffer much by comparison with the high class pressure-sensitive adhesives which use rosin or the terpene resins as the tackifier component.

Further, the compatibility between the invention hydrocarbon resin and the ethylene-vinyl acetate copolymer is good, and thus the invention hydrocarbon resin is extremely suitable as a tackifier component for the ethylene-vinyl acetate copolymer type hot-melt adhesive or coating, with the consequence that a hot-melt composition possessing superior adhesive strength can be provided.

Thus, there is further provided in accordance with this invention a pressure-sensitive adhesive and a hot-melt composition, which contain the invention hydrocarbon resin as the tackifier component.

The pressure-sensitive adhesive of this invention is comprised of rubber and the aforesaid hydrocarbon resin according to this invention, i.e., a cationic copolymerization product of the aforesaid hydrocarbon fraction (A) and dicyclopentadiene (B), which resin contains 20 to 80% by weight, based on the total weight of the hydrocarbon resin, of the unit derived from the dicyclopentadiene (B).

The pressure-sensitive adhesive of this invention can be prepared by blending the hydrocarbon resin obtained according to this invention with rubber. Usable as the rubber are either the natural or synthetic rubbers.

Examples of the usable rubbers include natural rubber, a styrene-butadiene copolymer rubber, polybutadiene, polyisoprene, polyisobutylene, a butyl rubber, polychloroprene, a butadiene-acrylonitrile copolymer rubber, a polyvinyl ether, and the like, especially natural rubber, a styrene-butadiene copolymer rubber and polyisoprene rubber.

The hydrocarbon resin is usually blended with the rubber in a proportion of about 30 to 150, preferably 50 to 100 parts by weight per 100 parts by weight of the rubber.

The pressure-sensitive adhesives of this invention can contain, in addition to the hydrocarbon resin and the rubber, a plasticizer such as process oil, polybutene, dioctylphthalate (DOP) and dibutylphthalate (DEP); a filler such as calcium carbonate ($CaCO_3$), zinc oxide (ZnO) and titanium dioxide ($TiO_2$); a pigment such as zinc oxide (ZnO); an antioxidant (or antiozonate) such as 2,6-di-tert.-butyl-p-cresol, 2,5-di-tert.-butylhydroquinone (DBH) and 2,2'-methylene-bis-(4-methyl-6-tert.-butyl phenol) (W-400); a stabilizer, etc.

The amounts in which the foregoing additives are used are not critical and can be suitably varied in accordance with the intended use of the pressure-sensitive adhesive. For example, the plasticizer and antioxidant can each be used in an amount of 1 to 5% by weight based on the total weight of the adhesive.

The blending operation can be conducted in a conventional manner such as using a blending roll or in an appropriate solvent.

More particularly the pressure-sensitive adhesives of the invention can be prepared using the following two approaches.

(1) SOLVENT TYPE

A rubber is dissolved in a solvent and the hydrocarbon resin of this invention and if desired, a plasticizer, a filler, an antioxidant, etc. are then added to the above solution followed by mixing at a temperature of room temperature to 50° C. for 5 to 25 hours. Suitable examples of solvents which can be used in this process are aromatic hydrocarbons such as benzene, toluene, xylene, ect.; aliphatic hydrocarbons such as pentane, hexane, heptane, etc.; halogenated aliphatic hydrocarbons such as trichlene, perclene, etc., and the like.

(2) SOLVENT-FREE TYPE

A composition containing the hydrocarbon resin of this invention and a rubber and optionally, a plasticizer, a filler, an antioxidant, etc. is mixed at a temperature of 80° to 150° C. for 0.5 to 3 hours using a Bambury mixer, an open roll, ect.

The pressure-sensitive adhesives of this invention thus prepared are superior in tackiness, adhesive strength, and cohesion and can provide high quality adhesive tapes and labels upon coating on base materials such as papers, cloths, plastic films, etc.

On the other hand, the hot-melt composition of this invention is composed of an ethylene-vinyl acetate copolymer and the hydrocarbon resin of this invention.

As the ethylene-vinyl acetate copolymer which is aded to the hydrocarbon resin for preparing the hot-melt composition, those containing 5 to 25 mol %, preferably 7 to 20 mol % of vinyl acetate and a melt index of 2.5 to 400, more preferably 5 to 300 are used. These materials preferably have a density of 0.90 to 0.99, more preferably 0.93 to 0.97. The ethylene-vinyl acetate copolymer can be produced according to the methods described in U.S. Pat. Nos. 2,200,429 and 2,703,794.

While the proportion in which the hydrocarbon resin (A) is blended with the ethylene-vinyl acetate copolymer is not critical and can be varied over a wide range depending upon the intended use of the hot-melt composition, usually used is a weight ratio of hydrocarbon resin (A) to ethylene-vinyl acetate copolymer of 1:2 to 4:1, and more preferably 7:10 to 3:1.

Generally, many additives can be added to hot-melt compositions. Similarly, in the present invention, additives may be added to the compositions. Preferred additives include, for example, plasticizers such as dioctyl phthalate, dibutyl phthalate, dioctyl adipate, diisobutyl phthalate, dimethyl phthalate, etc.; waxes having a 40° to 80° C. softening point such as petroleum waxes and polyolefin waxes (most preferred of these two wax-materials are those having a molecular weight of from 300 to 700); and antioxidants such as phenol type or bisphenyl type organic compounds and metal soaps, for example, 2,6-di-tert-butyl-4-methylphenol, styrenated phenol, 2,2'-methylene-bis-(6-tert-butyl-4-cresol), 4,4'-butylidene-bis-(6-tert-butyl-3-methylphenol), calcium stearate, barium stearate and the like.

The proportions of the above materials are not especially limited, and varying proportions can be used to achieve the well recognized function of these materials. However, typically, the plasticizer and antioxidant will each be used in an amount of 1 to 5%, if used, based on total composition weight.

When the hot-melt composition is mixed with the wax as an additive, the preferred mixing ratio of the hydrocarbon resin, the ethylene-vinyl acetate copolymer and the wax is, in general, as follows:

|  | Percent by weight |
|---|---|
| Hydrocarbon resin | 20 to 60 (30 – 50) |
| Ethylene-vinyl acetate copolymer | 20 to 60 (30 – 50) |
| Wax | 10 to 50 (20 – 40) |

Note.
The figures in the parentheses indicate a more preferred range.

In order to produce the hot-melt compositions using the hydrocarbon resin, the ethylene-vinyl acetate copolymer and, if desired, other additives, the following various methods are exemplary. Namely, a homogeneous fused solution is produced by adding the ethylene-vinyl acetate copolymer to a fused solution composed of the hydrocarbon resin and, if desired, the wax and a plasticizer, and the mixture is stirred with heating at a temperature of 140° to 180° C. For almost all the compositions in accordance with the present invention the components are best mixed at 155° to 165° C. The solution is molded by cooling into granules, flakes, pellets, rods, etc., depending upon its use. Further, mixers, open mixing rolls and kneaders can also be used for melting with heating.

Upon use, the above described compositions can be utilized as an adhesive or coating merely by melting them again. For instance, in the case of a coating, a curtain coater, etc., is used. In the case of an adhesive, a rod composition is used by adding a welding gum so as to bind the corners of moldings.

In the hot-melt compositions of the present invention, the hydrocarbon resins have, as earlier described, good compatibility with other components as compared with those produced using prior art petroleum resins. Namely, they not only have a low melt viscosity, good adhesiveness, and lesser offensive odor, but they also have good compatibility as compared with rosin or modified rosins which are similarly used. Further, they have a melt-viscosity and adhesiveness similar to those of rosin or modified rosins. They are particularly preferred because of their less offensive odor.

Thus, the hot-melt composition of this invention finds use as an adhesive or coating composition in the fields of bookbinding, can manufacturing, case making, paper bag making, woodworking, laminating, sealing, coating, etc.

The following Examples further illustrate the present invention without any intention of limiting its scope.

The properties of the resins obtained in the following Examples were measured by the following methods.

Molecular weight: Vapor pressure osmometry
Softening point (° C.): Japanese Industrial Standard (JIS) K-2531
Bromine number ($Br_2$ g/100 g): JIS K-2543
Color hue (Gardner): ASTM Method D-1544-58T The amount contained in the resin of the unit derived from the dicyclopentadiene was obtained by quantitatively analyzing the unreacted dicyclopentadiene by gas chromatography, substracting this from the amount fed and calculating from this difference.

On the other hand, the tackiness, adhesive strength and cohesion of the pressure-sensitive adhesives and hot-melt adhesives prepared in the examples were determined in the following manner.

TESTING OF THE PRESSURE-SENSITIVE ADHESIVES (1) Tackiness (J. Dow Rolling Ball Method)

An adhesive tape having a width of 10 cm and a length of 30 cm was supported on a stand for the rackiness test, which had been set at an angle of 30° to the horizontal, with the opposite surface of the tape to the adheisve layer bearing surface facing the stand. Then a parchment paper was attached to the adhesive paper thus supported at a tape portion 15 cm from the upper end. Various steel balls having diameters ranging from 1/32 inch to 1 inch and differing from each other by 1/32 of an inch were rolled from a position on the parchment paper 10 cm up from the lower end of the parchment paper. The tackiness was expressed by the value obtained by multiplying the maximum diameter of the steel ball stopped on the adhesive layer of the adhesive tape within 10 cm down from the lower end of the parchment paper by 32 (ball No.). Thus, the higher is the value, the larger is the tackiness.

(2) Adhesive Strength (180° Stripping Method)

The test was conducted according to the method described in JIS Z-1524.

(3) Cohesion (0° Holding Strength Test)

An adhesive tape having a width of 25 mm was attached to a stainless steel plate of an area of 15 mm × 25 mm. The stainless steel plate having the adhesive tape was fixed above, a load of one kg was applied to the lower end of the adhesive tape attached to the plate, and then the distance which the tape had slipped after 1 hour was measured. Thus, a shorter distance of slipping indicates a higher cohesion.

TESTING OF THE HOT-MELT COMPOSITION

The hot-melt composition to be tested was applied to a 50-micron-thick aluminum foil to a thickness of 20 microns with an applicator, after which the coated surfaces were brought together and heat-sealed with a heat-sealer for 2 seconds at a temperature of 140° C. and a pressure of 1.0 kg/cm². The T-shaped peel strength was then measured in accordance with the JIS Method Z-1524 at a pulling speed of 300 millimeters per minute.

The peel strength so measured is defined as "adhesive strength (g/25 mm)".

EXAMPLES 1–3 AND CONTROLS 1–4

An aromatic hydrocarbon of the following composition boiling within the range of 140° to 210° C. (containing 51% by weight of polymerizable unsaturated hydrocarbons) obtained by the distillation of a hydrocarbon oil formed by the thermal cracking of naphtha and dicyclopentadiene were charged to a polymerization vessel in the proportions indicated in the following Table 4.

Composition of the hydrocarbon fraction:

| Component | percent by weight |
|---|---|
| Styrene | 0.8 |
| α-methylstyrene | 2.2 |
| vinyl toluene | 15.2 |
| β-methylstyrene | 1.5 |
| indene | 8.3 |
| methylindene | 6.1 |
| other cationically polymerizable aromatic hydrocarbon (9 – 12 carbon atoms) | 10.4 |
| olefins of 9 – 12 carbon atoms | 4.5 |
| diolefins of 9 – 12 carbon atoms | 2.0 |
| other saturated aromatic hydrocarbon of 8 – 12 carbon atoms | 38.5 |
| paraffins and unconfirmed component | 10.5 |

2.4 Grams of boron trifluoride phenol complex was then added to the polymerization vessel, and the polymerization reaction was carried out for 3 hours at a temperature indicated in Table 4, below, in an atmosphere of nitrogen. Next, the polymerization reaction was terminated by the addition of an aqueous caustic soda solution, following which the oil layer was separated, and the unreacted hydrocarbon was distilled off from this oil layer. Thus was obtained the hydrocarbon resin shown in Table 4, below.

Table 4

| | Polymerization Conditions and Properties of Resin | | | | | | | |
|---|---|---|---|---|---|---|---|---|
| | Aromatic hydrocarbon fraction (g) | Dicyclo-pentadiene (g) | Polymerization temperature (° C.) | Yield of resin (g) | Dicyclo-pentadiene content (wt %) | Softening point (° C.) | Color Hue (Gardner) | Bromine number |
| Example 1 | 240 | 60 | 35 | 170 | 32 | 100 | 12 | 36 |
| 2 | 180 | 120 | 35 | 156 | 42 | 104 | 11 | 39 |
| 3 | 60 | 240 | 35 | 112 | 75 | 98 | 12 | 47 |
| Control 1 | 300 | 0 | 50 | 144 | 0 | 102 | 12 | 26 |
| 2 | 260 | 40 | 40 | 161 | 18 | 101 | 12 | 29 |
| 3 | 30 | 270 | 40 | 85 | 83 | 99 | 13 | 50 |
| 4 | 0 | 300 | 40 | 67 | 100 | 105 | 13 | 53 |

Pressure-sensitive adhesives and hot-melt adhesives were then prepared from the hydrocarbon resins obtained in the above examples and control experiments by the procedures described below.

PREPARATION OF PRESSURE-SENSITIVE ADHESIVE

Twenty-four grams of the resin obtained above and 30 grams of each of the rubbers indicated in Table 5 were dissolved in 300 grams of toluene. The resulting solution was then applied to one side of a kraft paper with an applicator (coating thickness after drying: 40 ± 3 microns). Next, after drying the coated paper fro 20 minutes at 100° C., it was allowed to stand for 8 hours at room temperature.

The pressure-adhesive so obtained was tested for its tackiness, adhesive strength and cohesion with the results shown in Table 5, below.

PREPARATION OF HOT-MELT ADHESIVE

The resin obtained above, an ethylene-vinyl acetate copolymer (trade name "Eraflex" #220 produced by Mitsui Polychemical Co., Ltd., vinyl acetate content 28% by weight, melt index 50) and paraffin wax (melting point 60° C.) were melt-blended together in the ratios shown in Table 6 to prepare a hot-melt adhesive.

The hot-melt adhesives so obtained were tested for T-shaped peel strength with the results shown in Table 6, below.

Table 5

| | Pressure-sensitive adhesives | | | |
|---|---|---|---|---|
| Resins | Rubbers blended | Tackiness (Ball No.) | Adhesive strength (g/25 mm) | Cohesion (mm) |
| Example 1 | Natural rubber *1 | 25 | 770 | 0.1 |
| Example 2 | Natural rubber | 28 | 880 | 0.1 |
| Example 2 | Styrene-butadiene rubber *2 | 18 | 870 | 0.2 |
| Example 2 | Isoprene rubber *3 | 26 | 890 | 0.1 |
| Example 3 | Natural rubber | 21 | 980 | 0.2 |
| Control 1 | Natural rubber | 3 | 410 | 0.1 |
| Control 2 | Natural rubber | 4 | 510 | 0.1 |
| Control 3 | Natural rubber | 7 | 730 | 0.5 |

Table 5-continued

| | | Pressure-sensitive adhesives | | |
|---|---|---|---|---|
| Resins | Rubbers blended | Tackiness (Ball No.) | Adhesive strength (g/25 mm) | Cohesion (mm) |
| Control 4 | Natural rubber | 7 | 750 | 0.6 |

*1 Rubber Smoked Sheet No. 1, Mooney viscosity $ML_{1+4}$ (100° C.) 76
*2 "SBR-1502" (manufactured by Japan Synthetic Rubber Co., Ltd.)
*3 "MATSYN-2200" (manufactured by Japan Synthetic Rubber Co., Ltd.)

Table 6
Hot-melt adhesives

| Resins | Blending proportions (by weight) | | | Adhesive strength (g/25 mm) |
|---|---|---|---|---|
| | EVA | Resin | Wax | |
| Example 1 | 40 | 40 | 20 | 900 |
| 2 | 40 | 40 | 20 | 1010 |
| 3 | 40 | 40 | 20 | 1200 |
| 3 | 50 | 30 | 20 | 1240 |
| 3 | 30 | 50 | 20 | 1130 |
| 3 | 35 | 35 | 30 | 1150 |
| 3 | 45 | 45 | 10 | 1750 |
| Control 1 | 40 | 40 | 20 | 520 |
| 2 | 40 | 40 | 20 | 570 |
| 3 | 40 | 40 | 20 | 770 |
| 4 | 40 | 40 | 20 | 790 |

EXAMPLES 4-6 AND CONTROLS 5-7

The same aromatic hydrocarbon fraction as that used in Example 1 and an aliphatic hydrocarbon oil having a boiling point of at least 60° C. (containing 75% by weight of dicyclopentadiene, 11% by weight of a codimer of cyclopentadiene and isoprene, and 4% by weight of a $C_5$ unsaturated hydrocarbon) which was left as distillation bottoms after heating a crude $C_5$ fraction resulting from the thermal cracking of naphtha to 120° C., and then distilling it were placed in a polymerization vessel in a proportion indicated in Table 7, below, and, after adding 2.4 grams of boron trifluoride phenol complex, the polymerization reaction was carried out for 3 hours at the temperature indicated in Table 7 in an atmosphere of nitrogen. The polymerization reaction was then terminated by adding an aqueous caustic soda solution, following which the oil layer was separated, and the unreacted hydrocarbon was distilled off from this oil layer. The properties of the resulting resin are shown in Table 7.

Table 7

| | Polymerization Condition and Properties of Resin | | | | | | | |
|---|---|---|---|---|---|---|---|---|
| | | | | | Properties of Resin | | | |
| | Aromatic Hydrocarbon Fraction (g) | Aliphatic Hydrocarbon Oil (g) | Polymerization Temp. (° C) | Yield | Dicyclopentadiene Content (wt. %) | Softening Point (° C) | Color Hue (Gardner) | Bromine Number |
| Example 4 | 240 | 67 | 35 | 166 | 29 | 101 | 12 | 38 |
| 5 | 180 | 133 | 35 | 159 | 40 | 102 | 11 | 40 |
| 6 | 60 | 267 | 35 | 134 | 76 | 101 | 11 | 49 |
| Control 5 | 260 | 45 | 40 | 157 | 16 | 102 | 12 | 31 |
| 6 | 30 | 300 | 40 | 89 | 85 | 100 | 12 | 54 |
| 7 | 0 | 333 | 40 | 75 | >90 | 105 | 13 | 57 |

Further, except that the resin used was the hydrocarbon resin obtained in the foregoing exmples and control experiments, the treatment of the resin was otherwise carried out exactly as in Example 1 to prepare a pressure-sensitive adhesive and a hot-melt adhesive. The properties of the resulting adhesives were measured with the results shown in Table 8.

Table 8

| | Physical Properties of Adhesive | | | |
|---|---|---|---|---|
| | Pressure-sensitive Adhesive | | | Hot-melt Adhesive |
| Resin | Tackiness (Ball No.) | Adhesive Strength (g/25mm) | Cohesion (mm) | Adhesive Strength (g/25mm) |
| Example 4 | 27 | 800 | 0.1 | 970 |
| 5 | 31 | 1040 | 0.1 | 1230 |
| 6 | 24 | 990 | 0.1 | 1170 |
| Control 5 | 4 | 600 | 0.2 | 670 |
| 6 | 4 | 700 | 0.7 | 720 |
| 7 | 6 | 710 | 1.0 | 730 |

EXAMPLES 7 - 9

The polymerization reaction was operated exactly as in Example 5, except that 3 grams each of the compounds shown in Table 9, below, was used as catalyst instead of the boron trifluoride phenol complex used in Example 5. The properties of the resulting resin are shown in Table 9. Using so obtained resin, a pressure-sensitive adhesive and a hot-melt adhesive were prepared by operating exactly as in Example 1. The physical properties of these adhesives are shown in Table 10.

Table 9

| | | Properties of Resin | | | | |
|---|---|---|---|---|---|---|
| | | | Properties of Resin | | | |
| | Catalyst | Yield (g) | Dicyclopentadiene content (wht.%) | Softening Point (° C) | Color Hue (Gardner) | Bromine Number (g/100g) |
| Example 7 | Aluminum Chloride | 165 | 42 | 106 | 12 | 34 |
| 8 | Aluminum Bromide | 163 | 41 | 104 | 12 | 37 |
| 9 | Ethylaluminum dichloride | 142 | 37 | 98 | 11 | 37 |

Table 10

| Resin | Physical Properties of Adhesive | | | Hot-melt Adhesive |
| --- | --- | --- | --- | --- |
| | Pressure-sensitive Adhesive | | | |
| | Tackiness (Ball No.) | Adhesive Strength (g/25mm) | Cohesion (mm) | Adhesive Strength (g/25mm) |
| Example 7 | 30 | 1100 | 0.1 | 1250 |
| 8 | 29 | 1010 | 0.1 | 1200 |
| 9 | 30 | 1150 | 0.1 | 1290 |

We claim:

1. A process for preparing a hydrocarbon resin which comprises copolymerizing (A) a hydrocarbon fraction boiling within the range of 135° to 280° C which is obtained by cracking, reforming and/or refining petroleum and contains, based on the weight of the fraction, 20 to 80% of polymerizable unsaturated hydrocarbons comprising, based on the weight thereof, 60 to 90% of cationically polymerizable aromatic hydrocarbons, 5 to 15% of olefins and 0 to 10% of diolefins, with (B) dicyclopentadiene in the presence of a Friedel-Crafts catalyst in a proportion such that the resulting hydrocarbon resin contains, based on the total weight thereof, 20 to 80% of a unit derived from the dicyclopentadiene (B).

2. The process of claim 1 wherein said hydrocarbon fraction (A) is one boiling in the range of 140-210° C.

3. The process of claim 1 wherein said hydrocarbon fraction (A) contains, based on the total weight thereof, 30 to 75% of polymerizable unsaturated hydrocarbons.

4. The process of claim 1 which comprises using said hydrocarbon fraction (A) and dicyclopentadiene (B) in a proportion such that the weight ratio of the polymerizable unsaturated hydrocarbons contained in the hydrocarbon fraction (A) to dicyclopentadiene (B) is 1:9 to 3:1.

5. The process of claim 1 wherein said resulting hydrocarbon resin contains, based on the total weight thereof, 30 to 70% of the unit derived from the dicyclopentadiene (B).

6. The process of claim 1 wherein said Friedel-Crafts catalyst is selected from the group consisting of aluminum chloride, boron trifluoride and boron trifluoride complexes.

7. The process of claim 1 wherein said copolymerization reaction is carried out at a temperature ranging between −10° C. and 100° C.

8. A hydrocarbon resin having a number average molecular weight of 300 to 2500, a softening point of 40° to 180° C., a bromine number of 5 to 100 g/100 g, and a Gardner color hue of 5 to 17, which comprises a cationic polymerization product of the mixture of (A) a hydrocarbon fraction boiling within the range of 135° to 280° C which is obtained by cracking, reforming and/or refining petroleum and contains, based on the weight of the fraction, 20 to 80% of polymerizable unsaturated hydrocarbons comprising, based on the total weight thereof, 60 to 90% of cationically polymerizable aromatic hydrocarbons, 5 to 15% of olefins and 0 to 10% of diolefins, and (B) dicyclopentadiene, said resin containing, based on the total weight thereof, 20 to 80% of the unit derived from the dicyclopentadiene (B).

9. A resin of claim 8 wherein said hydrocarbon fraction (A) is one boiling in the range of 140° – 210° C.

10. A resin of claim 8 wherein said hydrocarbon fraction (A) is one containing, based on the total weight thereof, 30 to 75% of polymerizable unsaturated hydrocarbons.

11. A resin of claim 8 wherein is contained, based on the total weight thereof, 30 to 70% of the unit derived from the dicyclopentadiene (B).

12. A resin of claim 10 wherein said polymerizable unsaturated hydrocarbons comprise, based on the total weight thereof, 70 to 90% of cationically polymerizable aromatic hydrocarbons, 5 to 10% of olefins and 1 to 5% of diolefins.

13. A pressure-sensitive adhesive which comprises (a) rubber and (b) a hydrocarbon resin having a molecular weight of 300 to 2500, a softening point of 40° to 180° C, a bromine number of 5 to 100 g/100 g, and a Gardner color hue of 5 to 17, said resin comprising a cationic polymerization product of the mixture of (A) a hydrocarbon fraction boiling within the range of 135° to 280° C which is obtained by cracking, reforming and/or refining petroleum and contains, based on the weight of the fraction, 20 to 90% of polymerizable unsaturated hydrocarbons comprising, based on the total weight thereof, 60 to 90% of cationically polymerizable aromatic hydrocarbons, 5 to 15% of olefins and 0 to 10% of diolefins, and (B) dicyclopentadiene, said hydrocarbon resin containing, based on the total weight thereof, 20 to 80% of the unit derived from the dicyclopentadiene (B).

14. An adhesive of claim 13 wherein said rubber is a member selected from the group consisting of natural rubbers, styrene-butadiene copolymer rubbers, polybutadienes, polyisoprenes, polyisobutylenes, butyl rubbers, polychloroprenes, butadiene-acrylonitrile copolymer rubbers, and polyvinyl ethers.

15. An adhesive of claim 13 containing 30 to 150 parts by weight of the cationic polymerization product per 100 parts by weight of the rubber.

16. A hot-melt composition which comprises (a) an ethylene-vinyl acetate copolymer containing 5 to 25 mol % of vinyl acetate and having a melt index of 2.5 to 400 and (b) a hydrocarbon resin having a molecular weight of 300 to 2500, a softening point of 40° to 180° C, a bromine number of 5 to 100 g/100 g, and a Gardner color hue of 5 to 17, said resin comprising a cationic polymerization product of the mixture of (A) a hydrocarbon fraction boiling within the range of 135° to 280° C which is obtained by cracking, reforming and/or refining petroleum and contains, based on the weight of the fraction, 20 to 90% of polymerizable unsaturated hydrocarbons comprising, based on the total weight thereof, 60 to 90% of cationically polymerizable aromatic hydrocarbons, 5 to 15% of olefins and 0 to 10% of diolefins, and (B) dicyclopentadiene, said hydrocarbon resin containing, based on the total weight thereof, 20 to 90% of the unit derived from the dicyclopentadiene (B).

17. A hot-melt composition of claim 16 wherein said ethylene-vinyl acetate copolymer contains 7 to 20 mol % of vinyl acetate and has a melt index of 5 to 300.

18. A hot-melt composition of claim 16 wherein the weight ratio of said cationic copolymerization product to said ethylene-vinyl acetate copolymer is 1:2 to 4:1.

19. A hot-melt composition of claim 16 wherein is further incorporated a wax.

20. A hot-melt composition of claim 19 comprising, based on the total weight thereof, 20 to 60% of the ethylenevinyl acetate copolymer, 20 to 60% of the hydrocarbon resin and 10 to 50% of the wax.

21. The process of claim 1 wherein said polymerizable unsaturated hydrocarbons comprise, based on the total weight thereof, 70 to 90% of cationically polymerizable aromatic hydrocarbon, 5 to 10% of olefins and 1 to 5% of diolefins.

22. The process of claim 1 wherein said cationically polymerizable aromatic hydrocarbons comprise, based on the total weight thereof, 30 to 80% of vinyl-toluene and indene, 15 to 50% of styrene, alpha-methylstyrene, methylindene and beta-methylstyrene and 0 to 23.4% of $C_9 - C_{12}$ other cationically polymerizable aromatic hydrocarbons.

23. A hydrocarbon resin composition according to claim 8 which has a number average molecular weight of 400 to 1800, a softening point of 60° to 150° C, a bromine number of 10 to 70 g/100 g, and a Gardner color hue of 5 to 14.

24. A pressure-sensitive composition according to claim 13 in which said hydrocarbon resin (b) has a number average molecular weight of 400 to 1800, a softening point of 60° to 150° C, a bromine number of 10 to 70 g/100 g, and a Gardner color hue of 5 to 14.

25. A hot-melt composition according to claim 16 in which said hydrocarbon resin (b) has a number average molecular weight of 400 to 1,800, a softening point of 60° to 150° C, a bromine number of 10 to 70 g/100 g, and a Gardner color hue of 5 to 14.

* * * * *